June 30, 1970 R. W. KRUG 3,518,361
TWO-STAGE DC COUPLED VIDEO AMPLIFIER
Filed Nov. 29, 1966
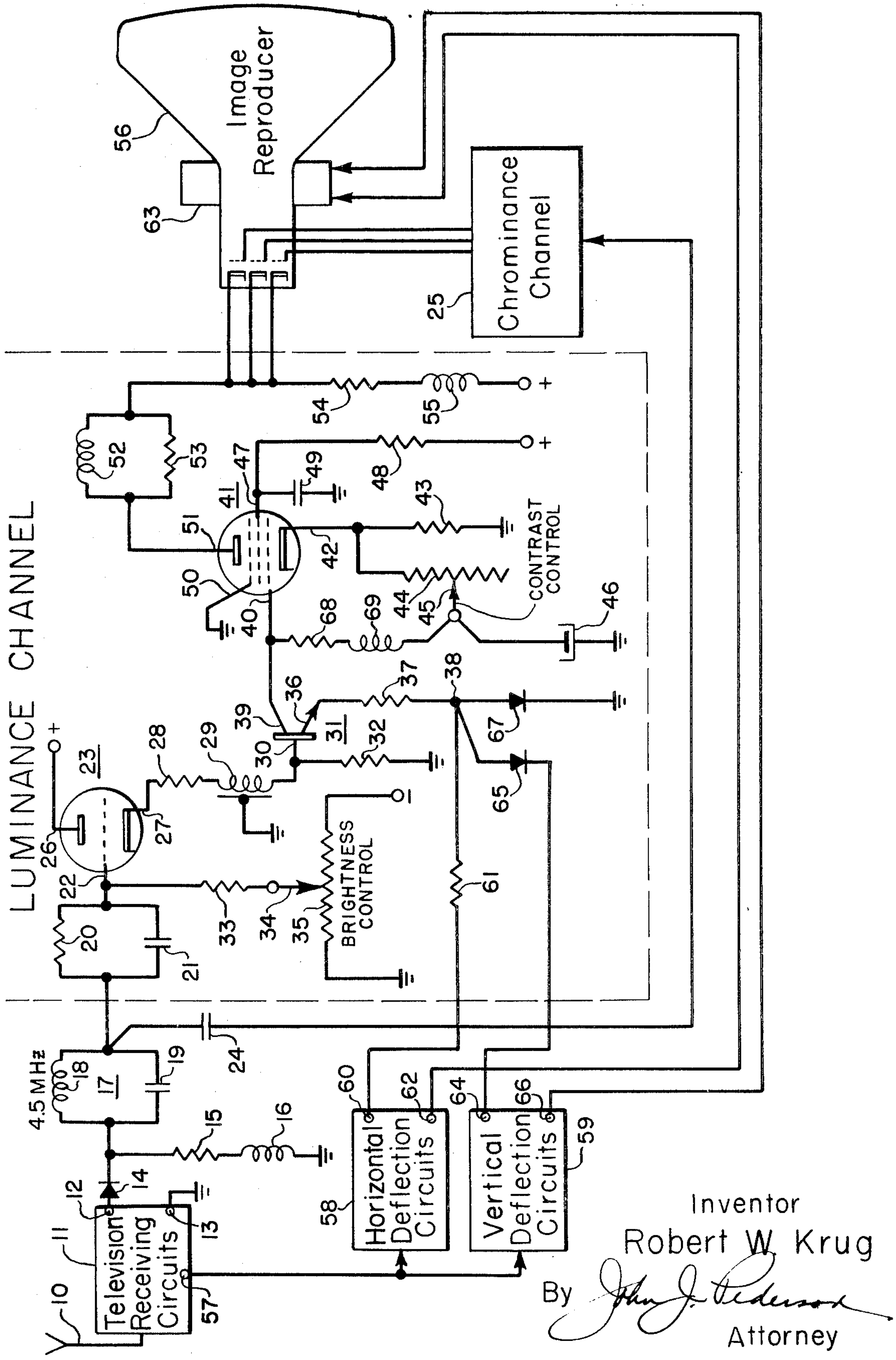
Inventor
Robert W. Krug
By John J. Pederson
Attorney 3,518,361
Patented June 30, 1970

3,518,361

TWO-STAGE DC COUPLED VIDEO AMPLIFIER

Robert W. Krug, Oak Park, Ill., assignor to Zenith Radio Corporation, Chicago, Ill., a corporation of Delaware Filed Nov. 29, 1966, Ser. No. 597,619
Int. Cl. H04n 5/48
U.S. Cl. 178—5.4 1 Claim

ABSTRACT OF THE DISCLOSURE

The luminance channel of a color television receiver includes a first transistor stage and a second vacuum tube stage. Contrast control is provided by cathode degeneration in the final video amplification stage. The operating load current for the first stage is derived from the cathode circuit of the output stage.

The present invention relates to improvements in television receivers and more particularly to a novel signal-translating circuit such as an improved luminance amplifier for use in the luminance channel of a color television receiver.

In accordance with the present United States standards governing color and monochrome television transmissions, the transmitted luminance signal has an alternating-curret (AC) component representing elemental brightness variations and a direct-current (DC) component representing average brightness level in the televised scene. For faithful color reproduction it is usually necessary that both components be applied to the receiver's image reproducer. Accordingly, the luminance channel of a color television receiver is usually designed to amplify and apply both components to the color image reproducer, which in present practice is a three-gun shadow-mask cathode-ray tube.

It has become standard practice to incorporate retrace blanking and viewer-adjustable brightness and contrast controls in the luminance channel to avoid the need for individual circuits for each of the three guns. The blanking circuit, which desirably has no effect on the applied AC and DC luminance components during non-blanking intervals, preferably takes the form of the circuit shown and claimed in the copending application of Eugene M. Cummings, Ser. No. 539,062, assigned to the present assignee. The brightness control, which also must have a minimum effect on the AC and DC luminance components, preferably takes the form of the circuit shown and claimed in the copending application of the present inventor, application Ser. No. 525,607, now Pat. No. 3,412,202, dated Nov. 19, 1968, assigned to the present assignee. The contrast control, which is intended to affect only the AC component of the luminance signal, advantageously takes the form of a partially by-passed resistor in the cathode circuit of the luminance amplifier tube. This arrangement, besides avoiding the need for frequency compensation often necessary with plate and grid connected controls, has the advantage of low power dissipation and negligible electrical insulation requirements.

Unfortunately, a cathode-connected contrast control has the inherent disadvantage of introducing DC degeneration to the luminance amplifier tube. As a result it has often been difficult, if not impossible, to obtain the high degree of direct-current transmission, i.e., ratio between DC and AC luminance components applied to the image reproducer, necessary for faithful color reproduction without the added expense of additional stages of amplification or higher gain amplifying devices.

Since their advent, television design engineers have been quick to utilize transistors in the circuitry of consumer television receivers. However, cost and performance considerations have heretofore limited the use of transistors to certain circuits, so that full transistorization has not been commercially practicable, particularly with color television receivers. Because of the large disparity in operating voltages between transistors and tubes (25 and 300 volts, respectively) television design engineers have heretofore been forced to utilize dropping resistors from the regular 300 volt receiver power supply to obtain operating voltage for individual transistors in hybrid receivers. This is often undesirable for reasons of poor voltage regulation, wasted power, improper impedance match and cost.

Accordingly, it is a general object of this invention to provide a new and improved signal-translating circuit for use, for example, as the luminance amplifier of a color television receiver.

It is a more specific object of the invention to provide a luminance amplifier circuit which overcomes the DC degenerative effects of a cathode-connected contrast control.

It is another object of the invention to provide a hybrid luminance amplifier which includes economical and efficient means for obtaining operating potential for a semiconductor amplifier device included therein.

The invention is directed to a signal-translating circuit which includes a first amplifier device having input and output electrodes, and further having a common electrode coupled to a plane of reference potential. Also included is a second amplifier device having input and common electrodes, and further having an output electrode coupled to a source of unidirectional operating potential. Means, including a series impedance, are connected between the common electrode of the second amplifier device and the plane of reference potential for developing a unidirectional operating potential. Means, including a load impedance, are connected between the output electrode of the first device and the common electrode of the second device for applying at least a portion of the developed potential to the first amplifier across the load impedance. Means coupling the output electrode of the first device to the input electrode of the second device are further included for translating the output signal from the first amplifier device to the second amplifier device.

The features of the present invention which are believed to be novel are set forth with particularity in the appended claims. The invention, together with further objects and advantages thereof, may best be understood by reference to the following description taken in connection with the accompanying drawing, in which the single figure is a schematic diagram of a color television receiver having a luminance channel constructed in accordance with a preferred embodiment of the invention.

The television receiver shown in the figure comprises an antenna 10 coupled to television receiving circuits 11, which include conventional translating and amplifying stages for producing an intermediate-frequency signal at terminals 12 and 13. Terminal 12 is connected to the anode of a diode detector 14 and terminal 13 is grounded. The cathode of diode 14 is connected to ground by a detector load circuit serially comprising a resistor 15 and a shunt-peaking inductance 16. The cathode of diode 14 is further connected to one terminal of a 4.5 mHz. intercarrier trap 17, which comprises the parallel combination of a variable inductance 18 and a capacitor 19. The other terminal of trap 17 is connected by the parallel combination of a resistor 20 and a capacitor 21 to the control electrode or grid 22 of an electron-discharge device 23 and by a capacitor 24 to the chrominance channel 25 of the receiver. The output of chrominance channel 25 is applied to the control grids of image reproducer 56.

Electron-discharge device 23 has an anode 26 connected to a positive unidirectional source and a cathode 27 connected by a circuit serially including a resistor 28 and a delay line 29 to the input electrode or base 30 of an electron amplifier device such as a N-P-N transistor 31. Base 30 is further returned to ground through a resistor 32, and control grid 22 of electron-discharge device 23 is connected by a resistor 33 to the arm 34 of a brightness control potentiometer 35. One terminal of potentiometer 35 is connected to a source of negative unidirectional current and the remaining terminal is grounded. The common electrode or emitter 36 of device 31 is connected through a resistor 37 to a juncture 38, and the output electrode or collector 39 is connected to the control electrode 40 of a further electron-discharge device, preferably a pentode 41.

The cathode 42 of device 41 is connected to ground by a cathode resistor 43. Also connected to cathode 42 is one terminal of a contrast control potentiometer 44, which has an arm 45 connected to ground by a capacitor 46. The screen grid 47 of device 41 is connected to a source of positive unidirectional current by a screen-dropping resistor 48 and is by-passed to ground by a capacitor 49. The suppressor 50 of device 41 is grounded and the anode 51 is connected to a source of positive unidirectional current by a circuit serially including a peaking network comprising the parallel combination of an inductance 52 and a resistor 53, a plate-load resistor 54 and a shunt-peaking inductance 55. The juncture formed by the peaking network 52, 53 and resistor 54 is connected to the three cathodes of image reproducer 56, which in this case is a standard three gun shadow-mask tricolor cathode-ray tube.

In addition to intermediate-frequency output terminals 12 and 13, television receiving circuits 11 have a sync output terminal 57 connected to horizontal deflection circuits 58 and vertical deflection circuits 59. Horizontal deflection circuits 58 have a blanking-pulse output terminal 60 connected by a resistor 61 to juncture 38 and a deflection output terminal 62 connected to the deflection yoke 63 of image reproducer 56. Vertical deflection circuits 59 have a blanking-pulse output terminal 64 connected to the cathode of a diode 65 and a deflection output terminal 66 connected to deflection yoke 63. The anode of diode 65 is connected to juncture 38, which is further connected to the anode of another diode 67. The cathode of diode 67 is connected to ground. A resistor 68 and an inductance 69 are connected in series between collector 39 and the arm 45 of contrast control potentiometer 44.

With the exception of the detailed circuitry of the luminance channel, the receiver is entirely conventional, and accordingly only a brief description of its general operation need be given here. A transmitted television signal is intercepted by antenna 10 and applied to television receiving circuits 11 wherein it is translated and amplified to appear as an intermediate-frequency signal at terminals 12 and 13. Diode detector 14 derives video-frequency information from this intermediate-frequency signal, and the composite video signal thus derived appears across resistor 15 and peaking inductance 16. Resistor 15 serves as the diode load resistor and peaking inductance 16 acts in conjunction with distributed capacitance to improve the frequency response of the detected video signal. The detected signal is also applied to the 4.5 mHz. trap 17, which serves to isolate the intercarrier sound signal developed by the detector from the luminance channel. Capacitor 24 couples the signal from trap 17 to chrominance channel 25 wherein color information in the form of color-difference signals is derived for subsequent application to image reproducer 56. Another capacitor 21 couples the same signal to control grid 22 of electron-discharge device 23, and resistor 20 serves to maintain a DC path for conveying the detected DC luminance component from detector 14 to grid 22. Device 23 is operated as a cathode-follower, so that the AC and DC components of the detected luminance signal impressed on grid 22 appear in-phase at approximately unity gain on cathode 27. This in-phase signal is coupled by resistor 28 and delay-line 29 to the base 30 of transistor 31. Delay-line 29 is incorporated here to delay the luminance signal so that it will be in proper time relation with respect to chrominance information concurrently applied through chrominance channel 25 to image reproducer 56. To reduce reflections in the delay-line, resistors 28 and 32 are selected to match the delay-line characteristic impedance, which is approximately 1500 ohms. These resistors further serve as a voltage divider to the AC and DC components of the luminance signal appearing on cathode 27, and in practice reduce the coupling of these components to base 30 by approximately 50%.

Brightness control potentiometer 35 serves to vary the operating bias on control grid 22 which, in turn, causes the grid-cathode bias on image reproducer 56 to vary. As disclosed and claimed in the previously mentioned copending application of Robert W. Krug, Pat. No. 3,412,202, dated Nov. 19, 1968, the resistance of potentiometer 35 is much lower than the resistance of resistors 20 and 33, so that the position of arm 34 has a negligible effect on the application of the DC luminance component from diode 14 to control electrode 22.

The AC and DC luminance components, as well as the bias impressed on control grid 22 by brightness control potentiometer 35, are translated by device 23 to the base 30 of transistor 31, wherein they are amplified and appear across the collector load impedance comprising resistor 68 and inductance 69. These same components are then applied to the control grid 40 of the second luminance amplifier device 41 for further amplification and appear at the anode 51 of that device. Resistor 43 serves as a conventional cathode resistor to develop grid-cathode bias for device 41 and, as will be seen shortly, to develop an operating potential for transistor 31. Resistor 43 is by-passed to the AC components of the luminance signal by capacitor 46 to an extent depending on the position of arm 45 on contrast control potentiometer 44. By varying the by-passing effect of capacitor 46, the amount of cathode degeneration offered to the AC component of the luminance signal is varied without affecting the amplification of the DC component by device 41, thus achieving the desired independence between contrast control action and DC transmission. Resistor 48 serves as a screen-dropping resistor to screen grid 47 and capacitor 49 by-passes this grid to ground.

Anode 51 is energized by a positive unidirectional source through inductance 55, resistor 54, and the parallel combination of inductance 52 and resistor 53. Inductance 52 and resistor 53 serve as a conventional plate series-peaking network to compensate for video-frequency circuit losses. Shunt-peaking inductance 55 is included for the same purpose. Resistor 54 serves as a plate load impedance for electron-discharge device 41, and the amplified AC and DC luminance components appearing thereacross are simultaneously applied to the three cathodes of image reproducer 56. In practice it is usually necessary to apply different amounts of luminance signals to each of the three guns, but here the circuitry ordinarily included for this purpose has been omitted for the sake of simplicity. The luminance signals thus applied are matrixed in image reproducer 56 with the color-difference signals developed in chrominance channel 25 to produce an image having brightness, hue, and color saturation characteristics corresponding to those of the televised image.

Horizontal deflection circuits 58 and vertical deflection circuits 59 are each synchronized to the received television transmission by means of sync pulses appearing at output terminal 57 of television receiving circuits 11. The sweep outputs of horizontal deflection circuits 58 and vertical deflection circuits 59 appear at output terminals 62 and 66, respectively, which are coupled to the deflection yoke 63 of image reproducer 56.

The luminance channel is periodically disabled or blanked during retrace intervals by blanking pulses applied through resistor 37 to the emitter 36 of transistor 31. Horizontal-rate blanking pulses are coupled from the blanking pulse output terminal 60 of horizontal deflection circuits 58 to juncture 38 by resistor 61. On the occurrence of each such pulse, diodes 65 and 67 are backed-biased so that the pulse is effectively applied to emitter 36 only. Vertical-rate blanking pulses are applied from blanking pulse output terminal 64 of vertical deflection circuits 59 to juncture 38 by forward-biased diode 65. Since diode 67 is back-biased to these pulses, and resistor 61 is of at least an order of magnitude higher than the output impedance of vertical deflection circuits 59, the vertical blanking pulses, like the horizontal blanking pulses, are effectively impressed on emitter 36. Application of blanking pulses to transistor 31 causes an increase in the negative bias on control grid 40 and a consequent increase in the voltage on anode electrode 51. This, in turn, results in the cathodes of image reproducer 56 being raised to a higher positive potential, thus blanking or interrupting each of the electron beams in image reproducer 56.

The hybrid luminance amplifier of the invention derives operating voltage for its transistor amplifier device in a novel way. The quiescent cathode current in device 41 develops a positive unidirectional potential of approximately 20 volts across cathode resistor 43. This potential is applied through contrast control 44, inductance 69 and resistor 68 to the collector 39 of transistor 31. The potential thus applied serves as an operating potential for transistor 31, eliminating the need for separate voltage dropping resistors from the receiver B+ supply.

A second advantage of the present luminance amplifier is that the DC degeneration effects of cathode resistor 43 are eliminated. It will be recalled that the conduction of an electron-discharge device, such as device 41, is dependent on the applied grid-cathode potential, i.e., the potential existing between control grid 40 and cathode 42. When the current in device 41 increases, as in response to the DC luminance component impressed on control grid 40 becoming more positive, the voltage developed across resistor 43 increases by virtue of increased cathode current. With a conventional interstage coupling circuit inductance 69 would be connected to ground and the potential developed across resistor 43 would be effectively in series opposition to the impressed luminance component. As a result, the net grid-cathode potential increase seen by device 41 would be reduced. This would have the effect of reducing the effective DC amplification obtained from device 41, thus reducing the DC transmission factor of the entire luminance channel. In practice this reduction would be substantial because resistor 43 must have a relatively high resistance if the desired contrast-control effect is to be obtained from contrast-control potentiometer 44.

In a luminance amplifier constructed in accordance with the invention the degenerative effects of cathode resistor 43 are eliminated. The applied grid-cathode potential is dependent only on the potential developed across resistor 68, which serves as a collector load resistor for transistor device 31. The resistance of contrast control potentiometer 44 is significantly lower than that of load resistor 68, so that the setting of the contrast control potentiometer has substantially no effect on the operation of device 31 nor on the amplified luminance components applied to image reproducer 56. Device 31 is chosen with the criteria that it withstand wide changes in operating potential without detriment to its signal-handling capacity and in this respect may be compared to a conventional pentode vacuum tube.

Absent the present invention, it would be necessary to incorporate means in the luminance channel for achieving additional DC amplification in order to obtain the 85% DC transmission level usually considered necessary for faithful color reproduction by image reproducer 56. This would entail raising the transconductance of device 41 or, in the absence of competitively priced pentodes having the requisite high transconductance, adding an additional stage of amplification between device 31 and device 41. Needless to say, the elimination of the need for special tubes or such additional circuitry affords important manufacturing economies and significantly reduces the complexity of the luminance channel.

While a particular embodiment of the invention has been shown and described, it will be obvious to those skilled in the art that changes and modifications may be made without departing from the invention in its broader aspects, and, therefore, the aim in the appended claim is to cover all such changes and modifications as fall within the true spirit and scope of the invention.

I claim:

1. In a luminance amplifier for use in a color television receiver or the like having a source of video-frequency luminance signals including AC and DC components and an image reproducer which is brightness-dependent on an applied luminance signal:

- a first amplifier device having output and common electrodes, and further having an input electrode coupled to said luminance signal source;
- a second amplifier device having input and common electrodes, and further having an output electrode coupled to said image reproducer;
- means, including a series impedance connected between said common electrode of said second device and a plane of reference potential, for developing a unidirectional operating potential from the operating current of said second amplifier device;
- a contrast control potentiometer having one terminal connected to said common electrode of said second device and having a movable arm bypassed to said plane of reference potential;
- means, including a load impedance connected between said output electrode of said first device and said movable arm of said contrast control potentiometer, for applying at least a portion of said operating potential to said first device to supply the operating current for said first device and develop an amplified luminance signal across said load impedance;
- and means coupling said output electrode of said first device to said input electrode of said second device for applying at least a portion of said amplified luminance signal to said second amplifier device.

References Cited

UNITED STATES PATENTS

| | | | |
|---|---|---|---|
| 2,979,664 | 4/1961 | Palmer et al. | 330—3 |
| 2,504,175 | 4/1950 | Bradley | 330—87 |
| 2,713,607 | 7/1955 | Rhodes | 178—5.4 |
| 2,752,431 | 6/1956 | Goodrich. | |
| 2,892,024 | 6/1956 | Davis | 178—5.4 |
| 2,897,263 | 7/1959 | Mesner | 178—5.4 |
| 2,927,958 | 3/1960 | Kroger | 178—5.4 |
| 3,091,659 | 3/1963 | Massman. | |
| 3,328,519 | 6/1967 | Willis. | |
| 3,414,669 | 12/1968 | Willis. | |

ROBERT L. GRIFFIN, Primary Examiner

R. P. LANGE, Assistant Examiner

U.S. Cl. X.R.

178—6; 330—98